United States Patent
Krah et al.

(10) Patent No.: US 9,851,849 B2
(45) Date of Patent: Dec. 26, 2017

(54) TOUCH DEVICE COMMUNICATION (75) Inventors: Christoph Horst Krah, Los Altos, CA (US); Steven Porter Hotelling, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 30 days.

(21) Appl. No.: 12/960,068

(22) Filed: Dec. 3, 2010

(65) Prior Publication Data

US 2012/0139865 A1 Jun. 7, 2012

(51) Int. Cl.
*G06F 3/045* (2006.01)
*G06F 3/044* (2006.01)
*G06F 3/041* (2006.01)

(52) U.S. Cl.
CPC ............ *G06F 3/044* (2013.01); *G06F 3/0416* (2013.01)

(58) Field of Classification Search
None
See application file for complete search history.

(56) References Cited

U.S. PATENT DOCUMENTS

| | | |
|---|---|---|
| 5,483,261 A | 1/1996 | Yasutake |
| 5,488,204 A | 1/1996 | Mead et al. |
| 5,585,817 A | 12/1996 | Itoh et al. |
| 5,729,008 A | 3/1998 | Blalock et al. |
| 5,812,109 A | 9/1998 | Kaifu et al. |
| 5,825,352 A | 10/1998 | Bisset et al. |
| 5,835,079 A | 11/1998 | Shieh |
| 5,880,411 A | 3/1999 | Gillespie et al. |
| 6,005,681 A | 12/1999 | Pollard |
| 6,188,391 B1 | 2/2001 | Seely et al. |
| 6,211,799 B1 * | 4/2001 | Post ............. A61B 5/0028 340/10.51 |
| 6,310,610 B1 | 10/2001 | Beaton et al. |
| 6,323,846 B1 | 11/2001 | Westerman et al. |

(Continued)

FOREIGN PATENT DOCUMENTS

| | | |
|---|---|---|
| JP | 2000-163031 A | 6/2000 |
| JP | 2002-342033 A | 11/2002 |
| WO | WO 2009105115 A2 * | 8/2009 |

OTHER PUBLICATIONS

Specifications of the Bluetooth System, Bluetooth v.2.0+EDR, Nov. 4, 2004, Bluetooth SIG.*

(Continued)

*Primary Examiner* — Ilana Spar
*Assistant Examiner* — Kirk Hermann
(74) *Attorney, Agent, or Firm* — Morrison & Foerster, LLP (57) ABSTRACT

A system for data communication between a plurality of touch devices is disclosed. The system can include a first touch device having a first touch surface, and at least one other touch device having at least one other touch surface. The first touch device and the at least one other touch device can include a touch controller detecting communications coupling between the first touch surface and the least one other touch surface. The first touch device and the at least one other touch device can include a communication unit communicating data between the first touch device and the at least one other touch device, via the first touch surface and the at least one other touch surface, when the communications coupling is detected. The communications coupling can be detected when a coupling conduit contacts, or is proximate to, the first touch surface and at least one other touch surface.

29 Claims, 10 Drawing Sheets

(56) References Cited

U.S. PATENT DOCUMENTS

| | | | |
|---|---|---|---|
| 6,502,191 | B1 | 12/2002 | Smith et al. |
| 6,690,387 | B2 | 2/2004 | Zimmerman et al. |
| 6,754,472 | B1 | 6/2004 | Williams et al. |
| 6,864,860 | B1 | 3/2005 | Zien |
| 7,015,894 | B2 | 3/2006 | Morohoshi |
| 7,031,756 | B1* | 4/2006 | Sim et al. ............... 455/566 |
| 7,184,064 | B2 | 2/2007 | Zimmerman et al. |
| 7,190,336 | B2 | 3/2007 | Fujisawa |
| 7,436,394 | B2 | 10/2008 | Halcrow et al. |
| 7,500,615 | B2 | 3/2009 | Tamayama |
| 7,663,607 | B2 | 2/2010 | Hotelling et al. |
| 7,714,923 | B2 | 5/2010 | Cok et al. |
| 8,664,548 | B2 | 3/2014 | Krah et al. |
| 2004/0140973 | A1 | 7/2004 | Zanaty |
| 2004/0219890 | A1* | 11/2004 | Williams ............... H04Q 9/04 455/100 |
| 2006/0026521 | A1 | 2/2006 | Hotelling et al. |
| 2006/0105712 | A1* | 5/2006 | Glass et al. ............ 455/41.2 |
| 2006/0197753 | A1 | 9/2006 | Hotelling |
| 2006/0217064 | A1* | 9/2006 | Glass ............... H04W 40/24 455/41.1 |
| 2008/0122792 | A1* | 5/2008 | Izadi et al. ............... 345/173 |
| 2008/0242346 | A1* | 10/2008 | Rofougaran et al. ...... 455/552.1 |
| 2008/0259043 | A1 | 10/2008 | Buil et al. |
| 2009/0025987 | A1 | 1/2009 | Perski et al. |
| 2009/0076803 | A1 | 3/2009 | Feher |
| 2009/0103643 | A1* | 4/2009 | Hyoung et al. ............... 375/260 |
| 2009/0114456 | A1 | 5/2009 | Wisniewski |
| 2009/0140986 | A1 | 6/2009 | Karkkainen et al. |
| 2009/0153493 | A1 | 6/2009 | Mizutani et al. |
| 2009/0167699 | A1* | 7/2009 | Rosenblatt ............ G06F 3/044 345/173 |
| 2009/0203393 | A1* | 8/2009 | Krueger ............ H04W 52/286 455/522 |
| 2010/0060592 | A1 | 3/2010 | Berstein et al. |
| 2010/0201812 | A1 | 8/2010 | McGibney et al. |
| 2010/0277435 | A1* | 11/2010 | Han ............... G06F 3/0416 345/174 |
| 2010/0289754 | A1* | 11/2010 | Sleeman ............ G06F 3/0416 345/173 |
| 2011/0061948 | A1 | 3/2011 | Krah |
| 2011/0118030 | A1* | 5/2011 | Walley et al. ............... 463/37 |
| 2011/0304583 | A1* | 12/2011 | Kruglick ............... 345/174 |
| 2013/0057415 | A1* | 3/2013 | Kim ............... H04B 13/005 341/20 |
| 2014/0049497 | A1 | 2/2014 | Krah |

OTHER PUBLICATIONS

Search Networking's definition of frame, searchnetworking.techtarget.com/definition/frame, p. 1.*

Haines, L. (Mar. 23, 2005). "Japanese Enable Human Area Network," *The Register* located at http:/www.theregister.co.uk/2005/03/23/human_area_network/print.html>, last visited Jun. 30, 2009, two pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Final Office Action dated Jan. 27, 2014, for U.S. Appl. No. 12/208,332, filed Sep. 10, 2008, 15 pages.

Final Office Action dated Apr. 2, 2015, for U.S. Appl. No. 14/047,808, filed Oct. 7, 2013, 13 pages.

Non-Final Office Action dated Dec. 18, 2015, for U.S. Appl. No. 14/047,808, filed Oct. 7, 2013, 17 pages.

Final Office Action dated Oct. 18, 2012, for U.S. Appl. No. 12/208,332, filed Sep. 10, 2008, 12 pages.

Final Office Action dated Mar. 4, 2013, for U.S. Appl. No. 12/558,140, filed Sep. 11, 2009, 19 pages.

Non-Final Office Action dated Apr. 13, 2012, for U.S. Appl. No. 12/208,332, filed Sep. 10, 2008, 16 pages.

Non-Final Office Action dated Aug. 2, 2012, for U.S. Appl. No. 12/558,140, filed Sep. 11, 2009, 15 pages.

Non-Final Office Action dated Jul. 2, 2013, for U.S. Appl. No. 12/558,140, filed Sep. 11, 2009, 10 pages.

Non-Final Office Action dated Oct. 9, 2013, for U.S. Appl. No. 12/208,332, filed Sep. 10, 2008, 14 pages.

Notice of Allowance dated Oct. 25, 2013, for U.S. Appl. No. 12/558,140, filed Sep. 11, 2009, 9 pages.

Non-Final Office Action dated Jul. 15, 2014, for U.S. Appl. No. 14/047,808, filed Oct. 7, 2013, 11 pages.

* cited by examiner

TOUCH DEVICE COMMUNICATION

FIELD

This relates generally to touch surfaces, and in particular, to data communication between a plurality of touch devices, via touch surfaces.

BACKGROUND

Many types of input devices are presently available for performing operations in a computing system, such as buttons or keys, mice, trackballs, joysticks, touch sensor panels, touch screens and the like.

In the case of hand-held personal digital assistants (PDA) or mobile devices, the input devices tend to utilize touch-sensitive display screens. When using a touch screen, a user can make a selection on the display screen by pointing directly to objects on the screen using a stylus or finger. Touch screens are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel or integrated with the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

While these hand-held touch devices can be convenient, the transfer of data between two such devices can be cumbersome, as conventional methods of communication (e.g., e-mail) are often necessary to facilitate such transfers.

SUMMARY

Presently disclosed embodiments are directed to solving issues relating to one or more of the problems presented in the prior art, as well as providing additional features that will become readily apparent by reference to the following detailed description when taken in conjunction with the accompanying drawings.

Embodiments of the present disclosure relate to data communication between a plurality of touch devices. A touch device can include advanced communications capabilities configured to enable the touch device to communicate with one or more other touch devices via the touch surfaces of the touch device and the touch surface(s) of the one or more other touch devices. Data communication via touch surfaces of touch devices can enable data exchange between the touch devices for pairing a plurality of devices, for example, or moving data files from one touch device to another touch device by forming a communications coupling between respective touch surfaces.

Embodiments described herein are directed to a system for data communication between a plurality of touch devices is disclosed. The system can include a first touch device having a first touch surface, and at least one other touch device having at least one other touch surface. The first touch device and the at least one other touch device can include a touch controller detecting communications coupling between the first touch surface and the least one other touch surface. The first touch device and the at least one other touch device can include a communication unit communicating data between the first touch device and the at least one other touch device, via the first touch surface and the at least one other touch surface, when the communications coupling is detected.

According to an embodiment, the communications coupling can be detected when a coupling conduit (e.g., a user) contacts the first touch surface and at least one other touch surface. According to another embodiment, the communications coupling can be detected when the first touch surface is proximate, but not in contact with, the at least one other touch surface As is become apparent from the present disclosure, data communication via touch surfaces of touch devices can enable data exchange between the touch devices for pairing a plurality of devices, for example, or moving data files from one touch device to another touch device by establishing an electrical coupling between respective touch surfaces. Moreover, simple modifications to existing hardware within the touch devices, or no modifications at all, may be necessary to implement data communication between the touch surfaces.

BRIEF DESCRIPTION OF THE DRAWINGS

The present disclosure, in accordance with one or more various embodiments, is described in detail with reference to the following figures. The drawings are provided for purposes of illustration only and merely depict exemplary embodiments of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DETAILED DESCRIPTION

In the following description of embodiments, reference is made to the accompanying drawings which form a part hereof, and in which it is shown by way of illustration specific embodiments that can be practiced. It is to be understood that other embodiments can be used and structural changes can be made without departing from the scope of the disclosed embodiments.

This relates to data communication between a plurality of touch devices. A touch device can include advanced communications capabilities configured to enable the touch device to communicate with one or more other touch devices via the touch surfaces of the touch device and the touch surface(s) of the one or more other touch devices. Data communication via touch surfaces of touch devices can enable data exchange between the touch devices for pairing a plurality of devices, for example, or moving data files from one touch device to another touch device by forming a communications coupling between respective touch surfaces.

It should be understood that various embodiments can be applicable to capacitive touch sensing technologies such as mutual capacitance touch sensor panels, single and multi-touch sensor panels, and other sensors in which multiple simultaneous stimulation signals are used to generate a composite sense signal. "Touch devices," as used herein, include sensor panels that can detect an actual touch on a touch surface as well as an object hovering near the surface. Furthermore, it should be understood that various embodiments can also be applicable to various touch sensor panel configurations, such as configurations in which the drive and sense electrodes are formed in non-orthogonal arrangements, on the back of a cover substrate, on the same side of a single substrate, integrated with display circuitry, or various other configurations which would be apparent to one of ordinary skill in the art. The following description is directed to capacitive sensing technologies; however, it is noted that the other technologies can be similarly implemented and the present disclosure is not limited to any particular sensing technology. For example, optical touch sensing technologies can be employed in which the communications coupling can be in the form of light, or acoustic wave touch sensing technologies can be employed in which the communications coupling can be in the form of acoustic waves.

Figure 1:
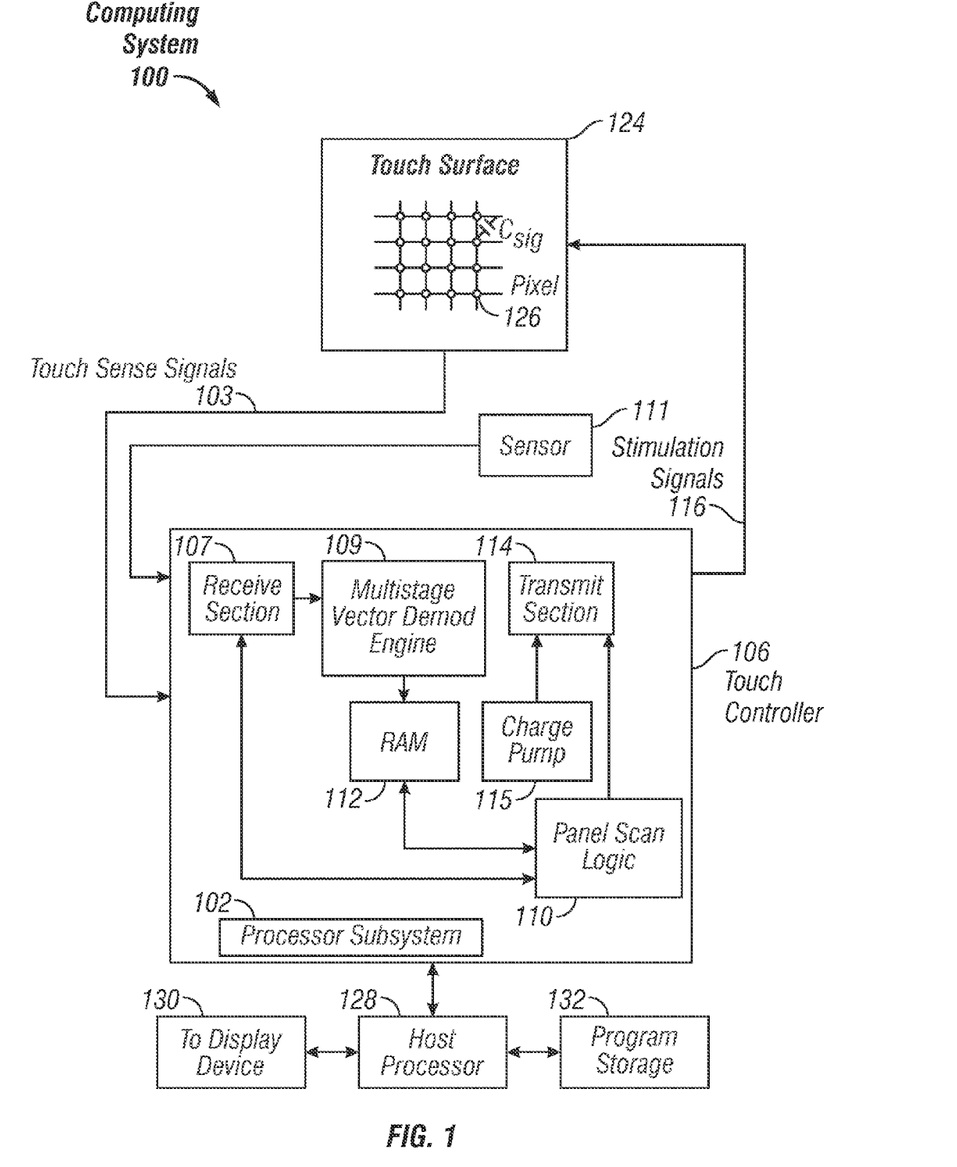
FIG. 1 illustrates an example computing system including a touch sensor panel according to one embodiment of the present disclosure.

FIG. 1 illustrates example computing system 100 including a touch surface 124, which can utilize touch controller 106, according to one embodiment. Touch controller 106 can be a single application specific integrated circuit (ASIC) that can include one or more processor subsystems 102, which can include, for example, one or more main (local) processors, such as ARM968 processors or other processors with similar functionality and capabilities. However, in other embodiments, some processor functionality can be implemented instead by dedicated logic, such as a state machine. Processor subsystems 102 can also include, for example, peripherals (not shown) such as random access memory (RAM) or other types of memory or storage, watchdog timers and the like. Touch controller 106 can also include, for example, receive section 107 for receiving signals, such as touch sense signals 103 from sense electrodes (e.g., one or more columns of electrodes) of touch surface 124, and other signals from other sensors such as sensor 111, etc. Charge pump 115 can be used to generate the supply voltage (Vstim in FIG. 2) for the transmit section, which can control the drive electrodes (e.g., one or more rows of electrodes). Although FIG. 1 shows charge pump 115 separate from transmit section 114, the charge pump can be part of the transmit section.

Touch controller 106 can also include, for example, a demodulation section such as multistage vector demod engine 109, panel scan logic 110, and a drive system including, for example, transmit section 114. Panel scan logic 110 can access RAM 112, autonomously read data from the sense channels and provide control for the sense channels. In addition, panel scan logic 110 can control transmit section 114 to generate stimulation signals 116 at various frequencies and phases that can be selectively applied to the drive electrodes of touch surface 124.

In some embodiments, touch surface 124 can be a mutual capacitance touch sensor panel having a plurality of drive and sense electrodes. The drive and sense electrodes can be formed of any conductive material such as silver ink, copper, Indium Tin Oxide (ITO) or Antimony Tin Oxide (ATO), etc. Mutual capacitance touch sensors, for example, can be formed from a matrix of drive and sense electrodes of a conductive material, often arranged in rows and columns in horizontal and vertical directions on a substrate. Drive signals can be transmitted through the drive electrodes, resulting in signal (mutual) capacitances between the drive and sense electrodes at the crossover points (touch pixels) of the drive electrodes and the sense electrodes. The changes in signal capacitances due to a touch can be determined from sense signals that appear on the sense electrodes.

Touch controller 106 can be adapted to detect the change in mutual capacitance at each of the touch pixels as a finger or other object passes over or contacts the touch surface. Touch controller 106 can be configured to compute the position of finger movement based on the change in mutual capacitance at each of the touch pixels. Touch controller 106 can also be configured to report this information to other logic within touch controller 106, or host processor 128, for example. In non-capacitive embodiments, the touch controller can be adapted in accordance with the touch sensing technology to transmit or receive optical or acoustic wave communications, for example.

Figure 2A:
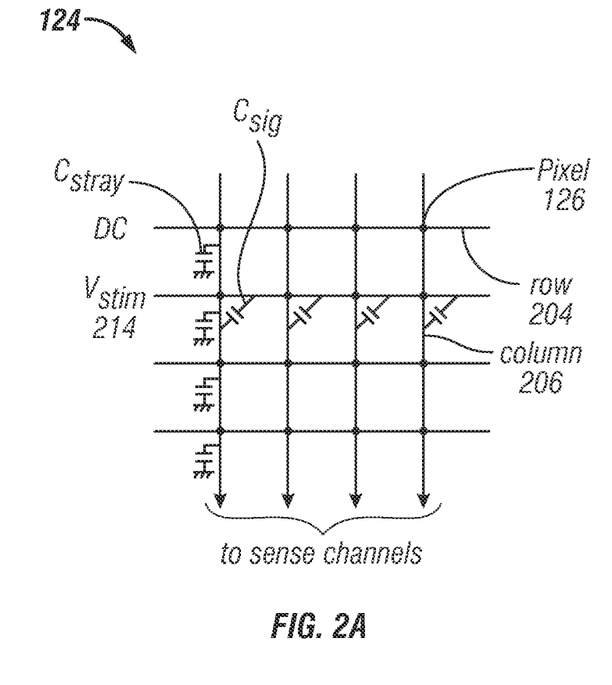
FIG. 2A illustrates an exemplary mutual capacitance touch sensor panel according to one embodiment of the present disclosure.

FIG. 2A illustrates exemplary mutual capacitance touch surface 124 according to an embodiment of the present disclosure. FIG. 2A indicates the presence of a stray capacitance Cstray at each pixel 126 located at the intersection of a row 204 (e.g., drive electrode) and a column 206 (e.g., sense electrode) (although Cstray for only one column is illustrated in FIG. 2A for purposes of simplifying the figure). In the example of FIG. 2, AC stimuli Vstim 214 can be applied to one row, while other rows can be connected to DC. Each stimulation signal on a row can cause a charge to be injected into the columns through the mutual capacitance present at the affected pixels. A change in the injected charge can be detected when a finger, palm or other object is present at one or more of the affected pixels. Note that although FIG. 2 illustrates rows 204 and columns 206 as being substantially perpendicular, one of ordinary skill in the art will understand that the drive electrodes 204 and sense electrodes 206 can be deposited or patterned on a substrate using a variety of techniques. In some embodiments, the row and column electrodes can be concentric circles and the drive electrodes can be radially extending electrodes (or vice versa). The conductive electrodes can be formed using various design patterns, including (but not limited to) an interdigitated comb design, interconnected diamond patterns, etc.

Figure 2B:
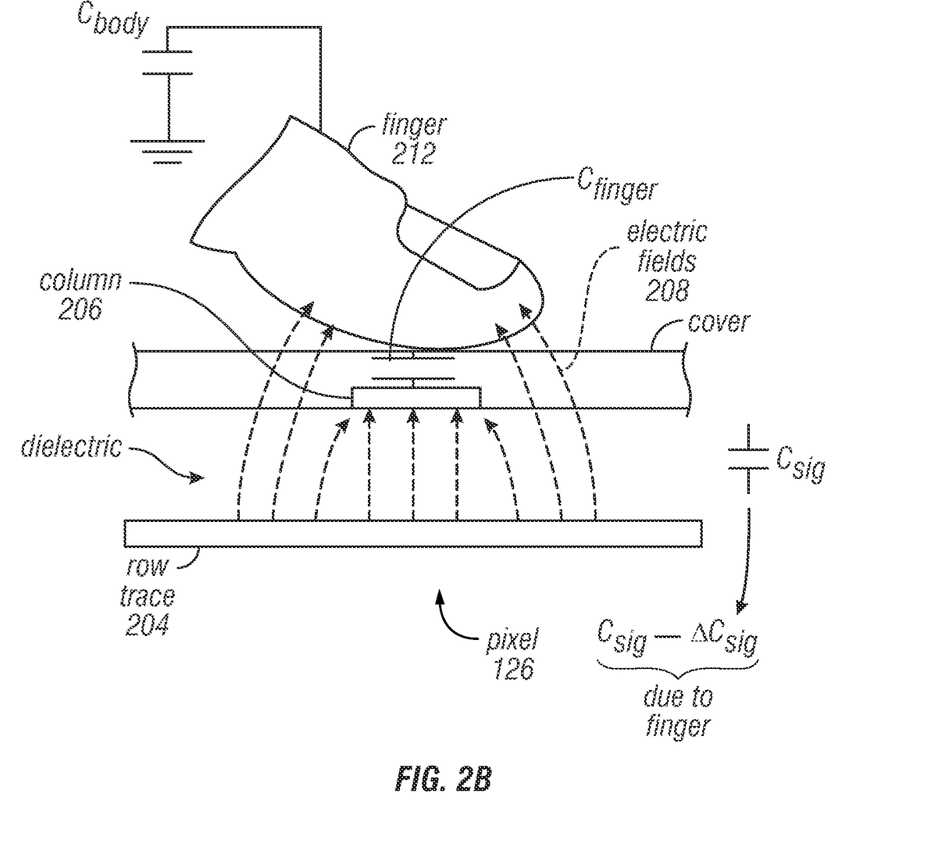
FIG. 2B is a side view of an exemplary pixel in a dynamic (touch) condition according to one embodiment of the present disclosure.

FIG. 2B is a side view of exemplary pixel 126 in a dynamic (touch) condition. In FIG. 2B, finger 212 has been placed near pixel 126. Finger 212 can be a low-impedance object at signal frequencies, and has an AC capacitance Cfinger from the column electrode 204 to the body. The body has a self-capacitance to ground Cbody, where Cbody can be much larger than Cfinger. If finger 212 blocks some electric field lines 208 between the row and column electrodes, the electric field lines are shunted to ground through the capacitance path inherent in the finger and the body, and as a result, the steady state signal capacitance Csig is reduced by ΔCsig. In other words, the combined body and finger capacitance act to reduce Csig by an amount ΔCsig, and can act as a shunt or dynamic return path to ground, blocking some of the electric fields resulting in a reduced net signal or mutual capacitance. The signal capacitance at the pixel 126 becomes Csig−ΔCsig, where Csig represents the static (no touch) component and ΔCsig represents the dynamic (touch) component. Note that Csig−ΔCsig can always be nonzero due to the inability of a finger, palm or other object to block all electric fields, especially those electric fields that remain entirely within the dielectric material.

According to embodiments of the disclosure, a plurality of touch surfaces 124 can be communicatively coupled to exchange data, when a capacitive coupling is formed via Cbody, for example. According to one embodiment, a user can contact the touch surfaces 124 of two or more touch devices with two or more fingers or other body parts, thereby establishing a capacitive coupling between the two touch devices via the body of the user. It should be understood that forming a capacitive coupling via a user's body by contacting the two touch surfaces 124 with two or more fingers or body parts is merely one example, and that various other conduits (communications couplings) can be utilized to establish communication. According to one embodiment, a capacitive coupling can be formed when the touch surfaces 124 are proximate to each other (i.e., via an air gap having a distance at which a ΔCsig caused by changes to the electric field of one touch surface can be detected at another touch surface) or contacting each other. For example, a touch capable cell phone can be placed face down on the surface of a touch enabled desktop display hence allowing the two devices to communicate through the capacitive coupling mechanism formed between their respective touch sensors.

Figure 3:
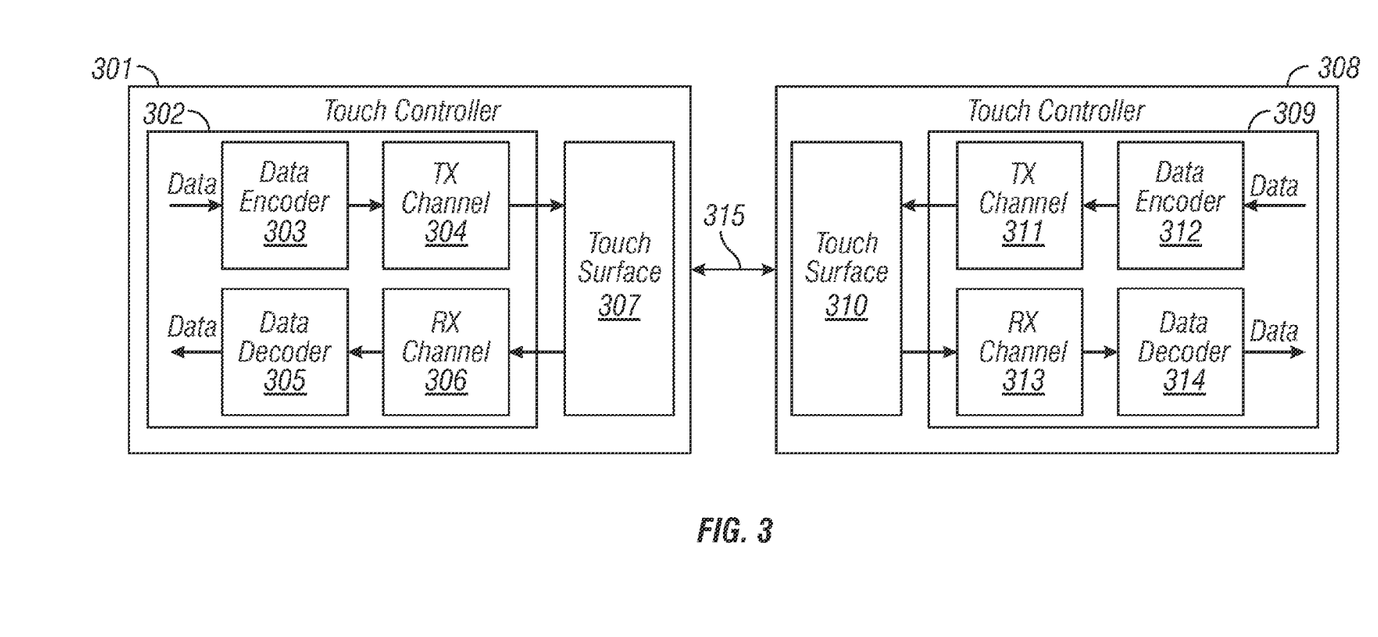
FIG. 3 shows a configuration of touch enabled devices configured for data communications via respective touch surfaces, according to one embodiment of the present disclosure.

FIG. 3 shows an exemplary configuration where two touch devices 301 and 308 are configured to communicate with each other via touch sensor surfaces 307 and 310, respectively. Touch devices 301 and 308 can contain, for example, a touch screen, a track pad, or any other touch surface. Data transfer can be facilitated through communications coupling 315 which can, in some embodiments, be a capacitive coupling between touch surfaces 307 and 310. Only two touch devices 301 and 308 are depicted for exemplary purposes; however, it can be appreciated by one of ordinary skill in the art that any number of touch devices could be coupled in order to exchange or communicate data therebetween.

According to one embodiment, as noted above, communications coupling 315 can merely be an air gap when the touch surfaces 307 and 310 can be brought in close proximity. As an alternative, connection 315 can be established by physical contact between touch surfaces 307 and 310. According to one embodiment, touch device 301 can listen for a capacitive coupling to device 308 at a predetermined frequency during a scan cycle, for example. For example, during the scan cycle, touch device 301 can listen for a known signature of device 308, which indicates that device 308 is present and is ready to transmit or receive data. The signature can represent a particular frequency, a pattern of frequencies, a pattern of data, and the like. Capacitance of the touch surface 310 of touch device 308, for example, can capacitively couple to the stimulated sense electrodes in touch surface 307 to cause a change in signal capacitance (ΔCsig) between drive and sense electrodes of touch surface 307 of touch device 301. This change in the signal capacitance can be determined, during the dedicated scan cycle of touch surface 307 for example, from sense signals at the sense electrodes of touch surface 307, as described above with reference to FIG. 2B.

Once it is determined at touch device 301 that a capacitive coupling with touch device 308 is established, data can be exchanged via the capacitive coupling 315 of touch surface 307 and touch surface 310. One skilled in the art would realize that various communication protocols for performing handshaking and establishing communication, such as transmitting a data request signal, transmitting and receiving data, and/or transmitting a acknowledgement (ACK) or negative acknowledgement (NACK) in return, can be implemented between touch devices 301 and 308. In this manner the receiving and transmitting devices can know which data, and in what format, should be transmitted and received.

In order to facilitate touch communication the touch scanning can be modified, according to certain embodiments. In the current embodiment, the touch scan can be comprised of a spectral analysis scan followed by NSTEP touch scans, where NSTEP can be equivalent to the number of rows in the sensor panel.

In order to facilitate touch communications, a separate touch communications ID step scan can be introduced. In one embodiment, the touch scan can be inserted between the spectral analysis scan and the NSTEP touch scan steps. A separate TOUCH COM ID decoder, which can be comprised of a digital demodulator, can look at the sum of all ADC data and regenerate the signature transmitted by the host device (see FIG. 3). TOUCH COM ID encoder can operate in the background and during normal a touch scan. In an alternate embodiment, the touch communications devices may not have a separate ID step but rather can transmit an ID during a normal touch scan by superimposing the touch stimulus signal with the ID signal and outputting the resulting composite signal during normal touch operation.

Figure 4:
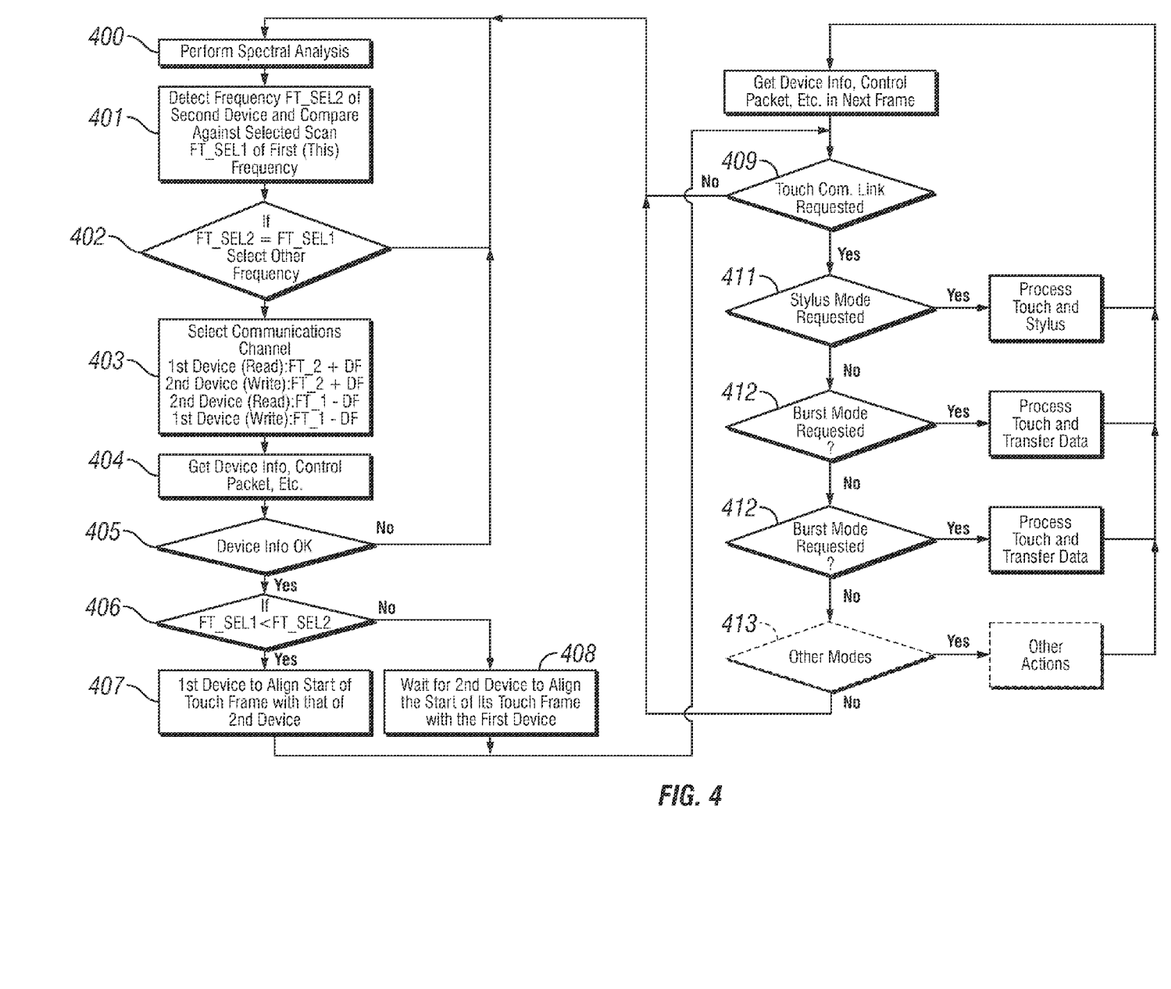
FIG. 4 shows an exemplary algorithm for conducting touch communications, according to one embodiment of the present disclosure.

As depicted in the algorithm of FIG. 4, the touch communications scan can be used to exchange control information between the host and target devices and can be used for synchronization purposes.

1) Frequency Detection Phase
   During the detection phase 401 after pairing the devices capacitively, for example, the devices can first detect their stimulus frequencies during spectral analysis 400 and can make necessary adjustment to ensure the respective stimulus frequencies do not coincide.

2) Communications Channel Selection Phase

During the frequency selection phase 402, the first device can open a first communications channel for transmitting at frequency FSTM_SEL2+dF, where FSTM_SEL2 can be the scan frequency of the $2^{nd}$ device and dF is a fixed frequency offset. The second device can listen on the first communications channel. Similarly, the 2nd device can open a communications for transmitting at frequency FSTM_SEL1−dF, where FSTM_SEL1 can be the scan frequency of the 1st device and dF can be a fixed frequency offset. The first device can listen on second communications channel. (See 403).

3) Synchronization and Link Phase

During synchronization phase the device with the lowest frequency FSTM(Min)=MIN(FSTM_SEL1, FSTM_SEL2) can synchronize its touch communication scan with the other device and can send its unique signature, device type, and control information to the other device through the established communications channel (see 404). The other device can then acknowledge 405 the communication through the communications channel, and touch communication mode can be initiated. Error checking can be utilized to ensure the integrity of the data transferred. If FT_SEL1<FT_SEL2, for example, (see 406) the $1^{st}$ device can align the start of a touch frame with that of the $2^{nd}$ device (see 407). On the other hand, the $1^{st}$ device can wait for the $2^{nd}$ device to align the start of its touch frame with the $1^{st}$ device (see 408).

4) Transfer Data

Figure 5A:
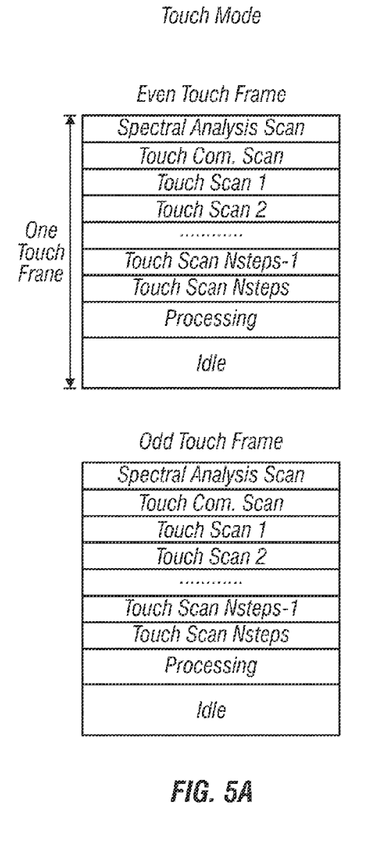
FIGS. 5A-5C shows exemplary even and odd frames for touch mode, touch and touch communications mode and communications burst mode, according to various embodiments of the present disclosure.
Figure 5B:
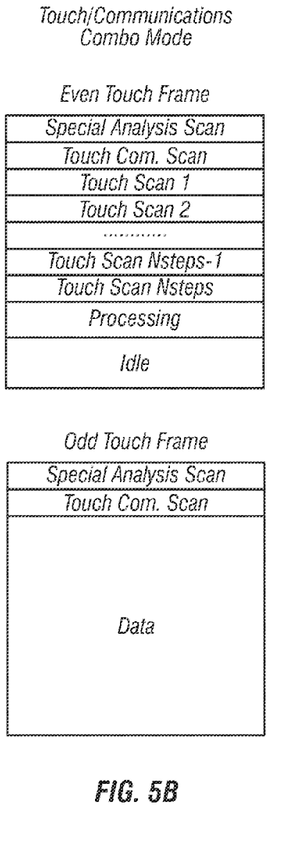
Figure 5C:
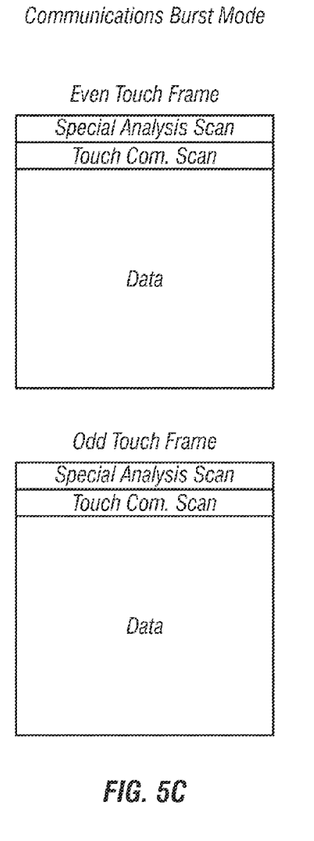

FIGS. 5A-5C shows exemplary even and odd frames for touch mode, touch and touch communications mode and communications burst mode, according to various embodiments of the present disclosure. In one embodiment, during the data transfer when touch communications link is requested 409, every odd frame can be dedicated to touch mode, whereas every even frame is dedicated for touch communications (see, e.g., FIG. 5B). This way touch and touch communication can coexist which can be important if a stylus is used, for example, as opposed to a touch mode where both even and odd frames are dedicated for touch (see, e.g., FIG. 5A). In another embodiment, the device can transition to a communications burst mode 412 (see, e.g., FIG. 5C) if a large amount of data needs to be transferred. Referring back to FIG. 4, in yet another mode, the device can transition into a stylus mode 411. Other modes 413 can also exist.

5) Abort Transfer, Resume Touch Only Scan

Depending on the control information sent at the beginning of each touch frame, the devices can go back to a regular touch scan.

Exemplary Definitions

Device Info can be device specific information such as, for example:
1) Device type (e.g., IPOD, IPHONE, STYLUS, etc.);
2) Panel geometry (e.g., Number of rows and columns);
3) Scan step duration (e.g. 200 uS);
4) Scan gap duration (e.g. 10 uS);
5) Stimulus frequency range and frequencies;
6) Frame duration (e.g. 16 mS);
7) Step type (e.g. single or multi-stimulus); and/or
8) Any other relevant device information.

Control information can be, for example:
1) Start touch communications, touch/communications combo mode;
2) Start touch communications, burst mode;
3) Start stylus mode;
4) Transition to touch only mode, keep devices linked;
5) Do not link devices;
6) Transition to touch only mode, unlink devices;
7) Send frequency calibration information;
8) Send alternate communications channel; and/or
9) Other information or various combinations of the information provided above.

As noted above, a capacitive coupling between the two panels can be facilitated by a user touching touch surface 307 with any part of one hand or body part and touch surface 310 with any part of the other hand or another body part, for example. In this case, a change in the mutual capacitance of one or more touch sensors, for example, caused by each hand or body part touching each touch surface 307 and 310 can be detected at both touch devices 301 and 308. The user's body, according to one embodiment, can act as a conduit providing capacitive coupling such that data can be transmitted through the user's body from one touch device to the other, and vice versa.

According to one embodiment, touch device 301 can transmit data by first encoding data in data encoder 303 and then transmitting data via transmit channel 304 to the touch surface 307 as described in further detail below. The signal received by touch surface 310 can then be captured by receive channel 313 and then decoded by data encoder 314. In a similar fashion, data can be transferred from touch device 308 back to touch device 301. Note that TX channels 304 and 311 can have a plurality of outputs. Similarly, RX channels 306 and 313 can have a plurality of inputs.

By enabling the touch device 301 to communicate with touch device 308, via their respective touch surfaces, a user of touch devices 301 and 308 can exchange data files, documents, images, applications and the like between the devices. For example, a user can contact touch surface 307 of device 301 in order to indicate data (e.g., an image) to be transferred to device 308. In this case, the user can determine which data to communicate to the other device, as well as the specific location for the data to be displayed on touch surface 310 of the receiving device 308 (if touch surface 310 is a touch screen, for example). When the user establishes a capacitive coupling with device 308 by contacting touch surface 310, the data can be transmitted via the user's body to device 308.

Touch communications can be used in a variety of scenarios, such as two Iphones, Ipads or Iphone and Ipad, for example. The following scenarios are provided below for exemplary purposed only, and are not intended to limit the scope of the disclosure in any way:

Scenario 1: File from First to Second Device Through Human Body Connection:

In order to transfer a file from a first device to a second device, the user can touch the symbol of the document or image on the first device while touching the location on the screen of the $2^{nd}$ device at which to transfer the document or image to, for example. A window can pop up at the $2^{nd}$ device asking for permission to transfer the file.

Scenario 2: File from First to Second Device Using Stylus

In order to transfer a file from a first device to a second device, the user can touch the symbol of the document or image on the first device with a $3^{rd}$ device (e.g. stylus) then contact the surface of the $2^{nd}$ device with the $3^{rd}$ device at the location to which to transfer the document or image. A window can pop up at the 2$^{nd}$ device asking for permission, for example, to transfer the file.

Scenario 3: File from First to Second Device Through Device to Device Connection In order to transfer a file from a first device to a second device, the user can touch the symbol of the document or image on the first device then place the two devices so they face each other in close proximity to facilitate the transfer. An audible signal, for example, can indicate the files have been transferred.

Scenario 4: Pairing Devices

In order to pair a mouse with a laptop, for example, the user can touch the laptop trackpad, for example, while holding the mouse, then a dialog, for example, can appear on the laptop screen to confirm pairing.

Scenario 5: Entertainment and Gaming

Touch communications transceivers can be embedded into a variety of items, such as volume or other controls, glasses, chess figures, debit cards, etc. Those items when placed on the surface of an iPad, for example, can communicate or interact with the iPad without having to use connectors and cables. Interaction with those devices can be location specific, for example (e.g. for playing chess, etc.).

The devices can be paired in the case where device 301 is a touch-sensitive mouse or trackpad, for example, and device 308 is a computing system with a touch screen. In this case, a user can touch the mouse or trackpad (e.g., device 301) and touch screen (e.g., device 308). When it is determined that an electrical coupling is formed, the appropriate data can then be communicated between the devices (via the user's body, for example).

Figure 6:
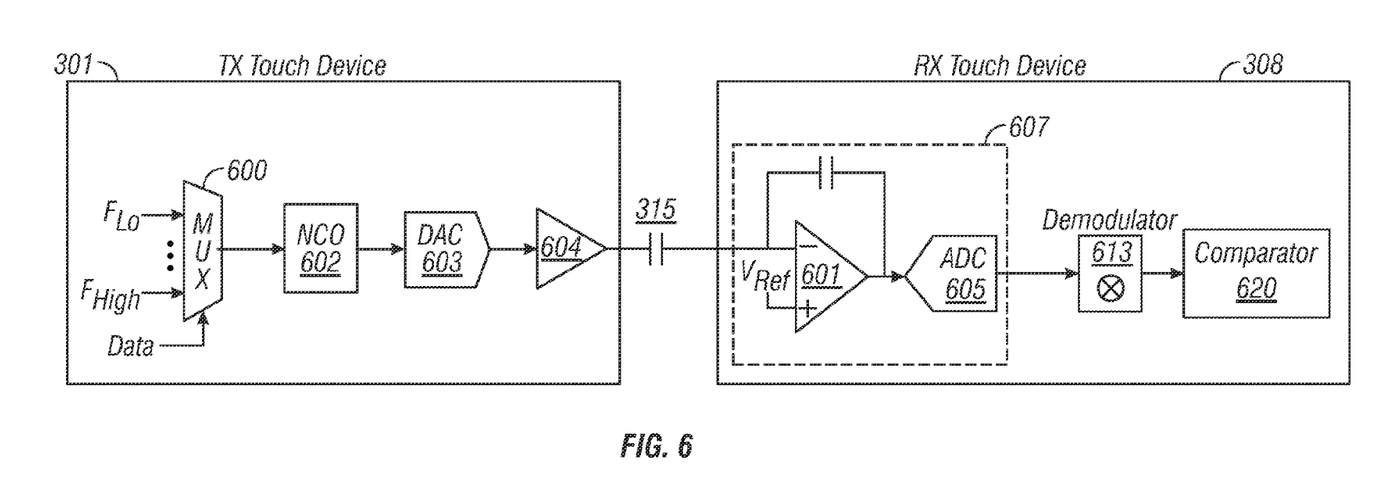
FIG. 6 shows an exemplary of transmitting and receiving touch devices, according to one embodiment of the present disclosure.

Implementing data communication between a plurality of touch devices can in some embodiments be performed utilizing hardware components already existing in the touch devices. FIG. 6 provides a high-level configuration of exemplary transmitting and receiving touch devices 301 and 308. In FIG. 6, both devices 301 and 308 can be configured to receive and transmit data (the transmitting and receiving of data generally referred to herein as communicating data). However, for exemplary purposes, device 301 is depicted as the transmitting device and device 308 is depicted as the receiving device. Transmitting device 301 can include a multiplexer (MUX) 600, a numerically controlled oscillator (NCO) 602 and Digital-to-Analog Converter (DAC) 603 and an amplifier and/or buffer 604, the functions of which are described in greater detail below with reference to FIGS. 7A-7B. Receiving device 308 can include a transimpedance amplifier (pre-amplifier) 601 and analog-to-digital converter (ADC) 605 (which can be incorporated within a sense channel 607 of a touch sensor of touch device 308). Receiving device 308 can further include a demodulator 613 and a comparator 620, the functions of which are described in greater detail below with reference to FIGS. 8A-8B. It should be understood that the specific circuit configurations shown in FIG. 6 are only exemplary, and that other circuits and other configurations are also possible. For example, rather than using the existing demodulation channel, raw ADC samples can be captured and processed by a dedicated logic block (not shown), or reconfigurable logic (such as a field-programmable gate array (FPGA)) or an advanced reduced-instruction-set-computing (RISC) machine (ARM) processor to facilitate a touch communications decode process.

Figure 7A:
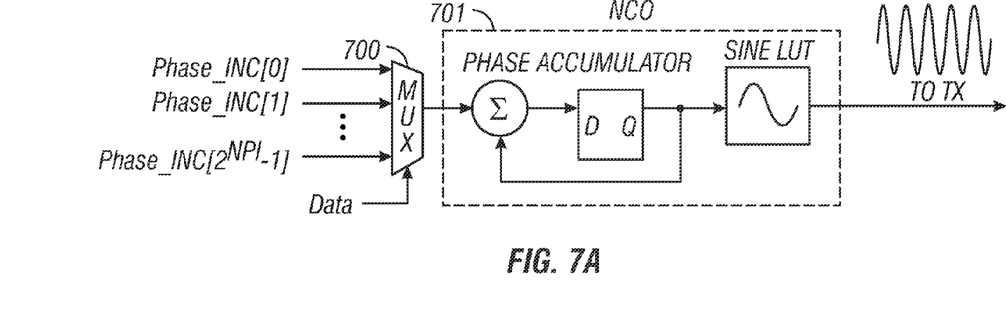
FIGS. 7A-7B show exemplary methods of encoding FSK/PSK modulated data, according to embodiments of the present disclosure.
Figure 7B:
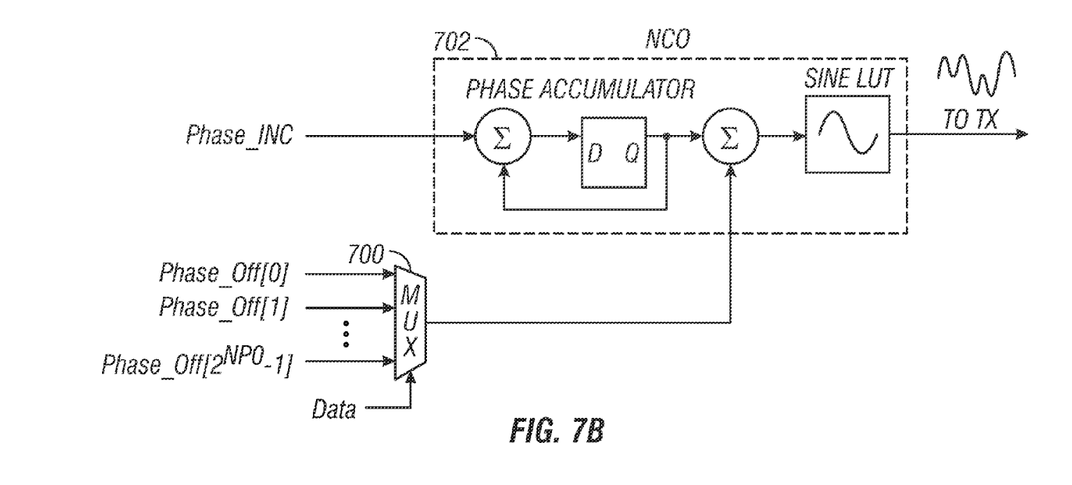

The transmitting touch device 301 can encode the data using phase shift keyed (PSK) encoding, frequency shift keyed (FSK) encoding or straight amplitude modulation (AM) (e.g., Manchester encoding) or functional equivalent or hybrid thereof. FIGS. 7A-7B show detailed exemplary circuits configured for coding FSK and PSK modulated data at a transmitting touch device 301. FIG. 7A shows an exemplary FSK/frequency modulation (FM) data encoder. The data to be encoded can be multiplexed via MUX 700 at various phase increments. Each phase increment value input to MUX 700 can represent a frequency as follows:

$$\varphi_{INC}(x) = 2^N \cdot \frac{f_{STM}(x)}{f_{DAC\_CLK}} \rightarrow f_{STM}(x) = \frac{\varphi_{INC}(x)}{2^N} \cdot f_{DAC\_CLK} \quad (1)$$

Here, $f_{STM}(x)$ can be the stimulus frequency for data value x; $f_{DAC\_CLK}$ can be the rate at which the phase accumulator is clocked; and N can be the resolution of the phase accumulator. Therefore, each data value can have its own stimulus frequency. The synthesized waveform can be passed on from a phase accumulator (as part of NCO 701) to a TX digital-to-analog converter (DAC), which converts the synthesized waveform, for transmission, into a analog waveform of the form:

$$V_{STM}(x) = V_{STM0} \cdot \sin\left(\frac{2 \cdot \pi \cdot \varphi_{INC}(x) \cdot f_{DAC\_CLK}}{2^N}\right) \quad (2)$$

The analog waveform can be transmitted via capacitive coupling 315, which may be an air gap between touch surfaces 307 and 310 or may be a user's body if the user is touching both touch surfaces 307 and 310, for example. Capacitive coupling 315 can alternatively be physical contact between touch surfaces 307 and 310, or one or more styli contacting the touch surfaces 307 and 310, where the styli can be hardwired or wirelessly coupled via any known wireless communication technique (e.g., WiFi, Blutetooth, etc.).

FIG. 7B shows an exemplary implementation of a PSK/phase modulation (PM) encoder. Here, a single phase increment is applied to the phase accumulator 702 associated with a stimulus frequency according to Equation (2). A static phase offset can be added to the output of the phase comparator. The phase offset can be selected from 2^N possible phase-offsets based on a data value via the MUX 700.

$$\varphi_{OFF}(x) = 2^N \cdot \frac{\varphi(x)}{2 \cdot \pi} \rightarrow \varphi(x) = \frac{2 \cdot \pi \cdot \varphi_{OFF}(x)}{2^N} \quad (3)$$

Here $\phi_{OFF}(x)$ can be the phase offset; $\phi(x)$ can be the desired phase and N can be the data resolution, equivalent to the total number of phase-offsets.

The stimulus waveform for a PSK modulated signal therefore can have the form:

$$V_{STM}(x) = V_{STM0} \cdot \sin\left(\frac{2 \cdot \pi}{2^N} \cdot (\varphi_{INC} \cdot f_{DAC\_CLK} + \varphi_{OFF}(x))\right) \quad (4)$$

Similarly, the PSK modulated signal can be transmitted via capacitive coupling 315, which may be an air gap between touch surfaces 307 and 310 or may be a user's body if the user is touching both touch surfaces 307 and 310, for example. As noted above, capacitive coupling 315 can alternatively be physical contact between touch surfaces 307 and 310, or one or more styli contacting the touch surfaces 307 and 310, where the styli can be hardwired or can communicate wirelessly, as provided above.

Figure 8A:
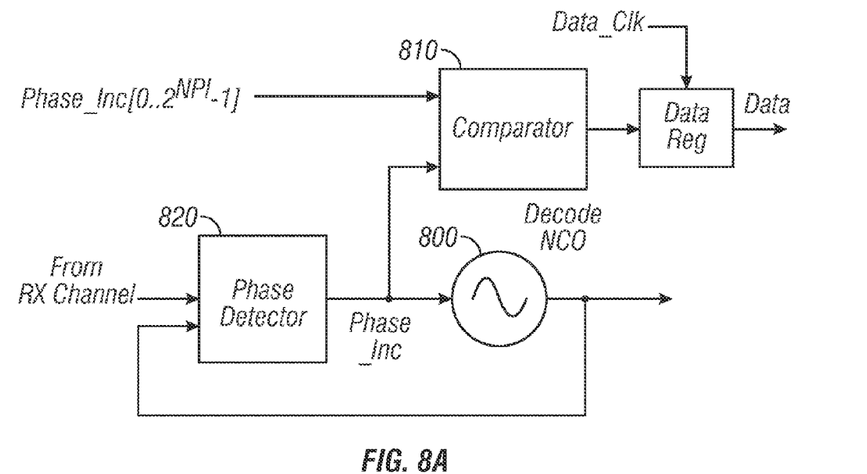
FIGS. 8A-8B show exemplary methods of decoding FSK/PSK modulated data, according to embodiments of the present disclosure.
Figure 8B:
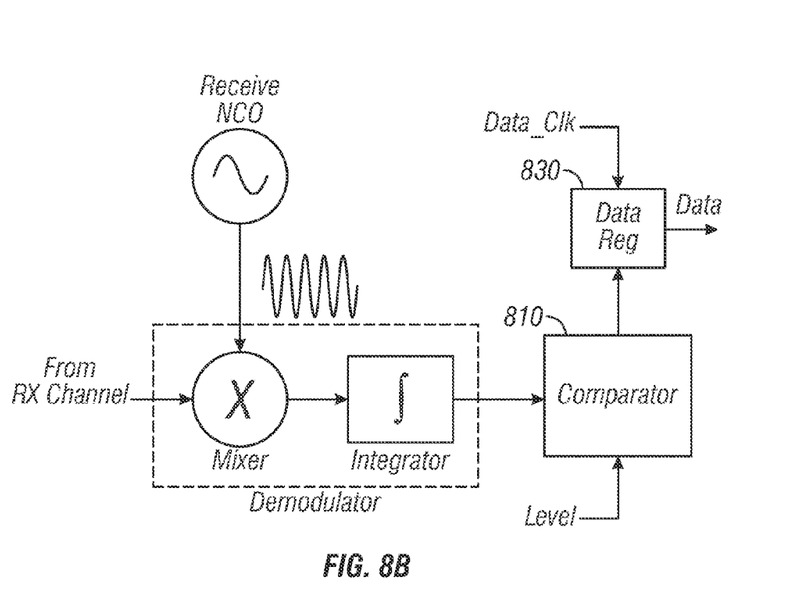

FIGS. 8A-8B show exemplary circuits configured for decoding FSK and PSK modulated data at a receiving touch device 308. The simplified circuit shown in FIG. 8A can be used to decode FSK modulated data. A dedicated decode NCO 800 can be used, whose synthesized decode stimulus waveform can be compared to the digitized ADC waveform from the receive channel by a phase comparator 810. The phase comparator 810 can adjust the phase increment into the data decode NCO 800 until the two waveforms match in frequency and phase. The resultant phase increment can approximately match the phase increment of the transmitter device according to Equation (1). The matching is a function of the frequency difference between the reference clock of the transmitter and receiver devices. In order to recover the data, a comparator 810 can be used, which compares the phase increment out of the phase detector 820 to pre-determined levels of phase_increment. According to one embodiment, the halfway point between adjacent phase increments can be selected for making the determination. For example, if the transmitter encodes phase_inc[0] as a binary zero and phase_inc[1] as a binary 1, then it can be practical to set the threshold level on the receiver device to (phase_inc[0]+phase_inc[1])/2. The data resolution can be a function of the number of phase_increment levels. A data resolution of NPI requires 2^NPI phase_increment levels.

FIG. 8B shows an exemplary method to decode FSK/PSK modulated data. For FSK modulated data the demodulator can behave as a discriminator that converts the FSK decoded signal into an AM modulated signal due to a passband frequency response of the demodulator at different frequencies. The demodulated result can be represented with the following equation:

$$N_{RESULT}(\omega_{FSK}) = \quad (5)$$
$$N_{FSK} \cdot N_D \cdot \sum_{N=1}^{N_{INT}} W_D(N) \cdot \sin\left(N \cdot \frac{\omega_{STM}}{f_{ADC\_CLK}}\right) \cdot \sin\left(N \cdot \frac{\omega_{FSK}}{f_{ADC\_CLK}}\right)$$

Here $N_{RESULT}$ can be the result after an integration over $N_{INT}$ integration cycles; $N_{FSK}$ and $N_D$ can be amplitudes of the FSK modulated data and the demodulation waveform, respectively; $\omega_{FSK}$ and $\omega_{STM}$ can be the frequencies (in radians) of the FSK and stimulus signal, respectively; and $W_D$ can be the demodulation window. The circuit in FIG. 8B can also be used to demodulate PSK modulated data.

The demodulated result can be expressed as:

$$N_{RESULT}(\omega_{FSK}) = \quad (6)$$
$$N_{PSK} \cdot N_D \cdot \sum_{N=1}^{N_{INT}} W_D(N) \cdot \sin\left(N \cdot \frac{\omega_{PSK}}{f_{ADC\_CLK}} + \varphi\right) \cdot \sin\left(N \cdot \frac{\omega_{STM}}{f_{ADC\_CLK}}\right)$$

Here $N_{RESULT}$ can be the result after an integration over $N_{INT}$ integration cycles; $N_{PSK}$ and $N_D$ can be amplitudes of the PSK modulated data and the demodulation waveform, respectively; $\omega_{PSK}$ and $\omega_{STM}$ can be the frequencies (in radians) of the PSK and stimulus signal, respectively; $W_D$ can be the demodulation window; and $\phi$ is the phase shift between the PSK modulated signal and the demodulation signal. Since $\omega_{PSK}=\omega_{FSK}$ $N_{RESULT}$ can become a function of $\cos(\phi)$, and $\phi$ is a function of the PSK modulated data from the transmitting device. Decoded data can be captured in a data register 830 at a clock rate DATA_CLK which can be the decimated version of the stimulus frequency.

Using the foregoing exemplary encoding/decoding techniques, a plurality of touch devices can be configured such that one touch device is able to communicate with one or more other touch devices via the touch surfaces of the touch device and the touch surface(s) of the one or more other touch devices. Data communication via touch surfaces of touch devices can enable data exchange between the touch devices for pairing a plurality of devices, for example, or moving data files from one touch device to another touch device by establishing an electrical coupling between respective touch surfaces. Moreover, simple modifications to existing hardware within the touch devices, or no modifications at all, may be required to implement data communication between the touch surfaces.

Figure 9A:
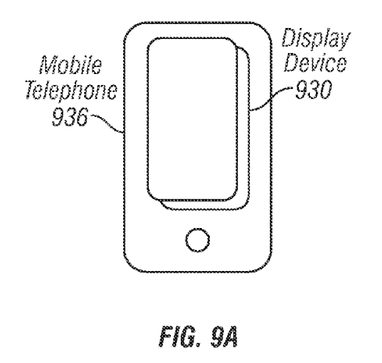
FIG. 9A illustrates an exemplary mobile telephone that can include a touch device configured for data communication with at least one other touch device, according to various embodiments described herein.

FIG. 9A illustrates an example mobile telephone 936 that can include display device 930, the display device configured for data communication with at least one other touch device, according to one of the various embodiments described herein.

Figure 9B:
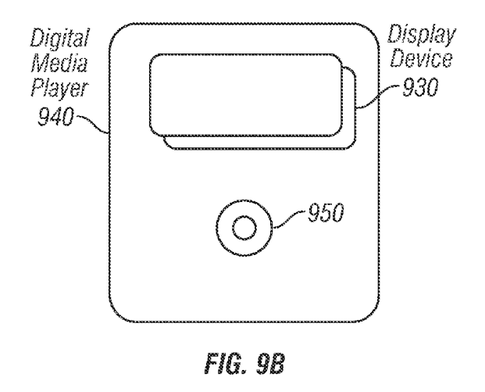
FIG. 9B illustrates an exemplary digital media player that can include a touch device configured for data communication with at least one other touch device, according to various embodiments described herein.

FIG. 9B illustrates an example digital media player 940 that can include touch sensor 950 and display device 930, the touch sensor and/or the display device configured for data communication with at least one other touch device, according to one of the various embodiments described herein.

Figure 9C:
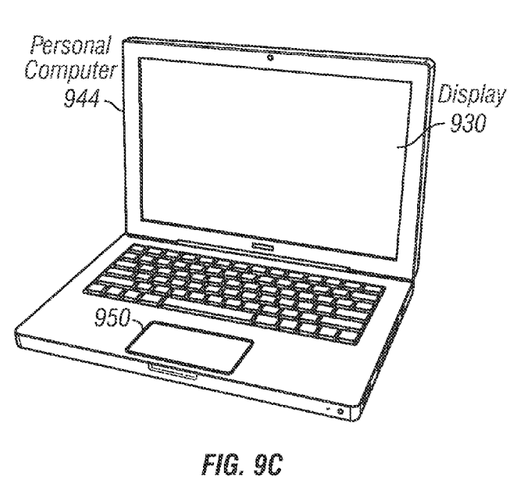
FIG. 9C illustrates exemplary personal computer that can include a touch device configured for data communication with at least one other touch device, according to various embodiments described herein.

FIG. 9C illustrates an example personal computer 944 that can include touch sensor panel (track pad) 950 and display 930, the touch sensor panel and/or the display device configured for data communication with at least one other touch device, according to one of the various embodiments described herein.

Note that one or more of the functions described above can be performed, for example, by firmware stored in memory (e.g., one of the peripherals) and executed by processor subsystem 102, or stored in program storage 132 and executed by host processor 128 (see FIG. 1). The firmware can also be stored and/or transported within any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any medium that can contain or store the program for use by or in connection with the instruction execution system, apparatus, or device. The computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

While various embodiments have been described above, it should be understood that they have been presented by way of example only, and not by way of limitation. Likewise, the various diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations. Additionally, although the disclosure is described above in terms of various exemplary embodiments and implementations, it should be understood that the various features and functionality described in one or more of the individual embodiments are not limited in their applicability to the particular embodiment with which they are described. They instead can be applied alone or in some combination, to one or more of the other embodiments of the disclosure, whether or not such embodiments are described, and whether or not such features are presented as being a part of a described embodiment. Thus the breadth and scope of the present disclosure should not be limited by any of the above-described exemplary embodiments.

What is claimed is:

1. A method of data communication, comprising:
   during a touch mode:
      sensing touch on a first touch surface of a first device during a plurality of touch frames;
      detecting a communications coupling with at least one other device at the first touch surface; and
      in response to the detection, transitioning to a touch communications mode; and
   during the touch communications mode:
      sensing touch on the first touch surface during at least one touch frame, and
      communicating data at the first device during at least one communication frame, the communicating of data being from the first device to the at least one other device via the first touch surface through the communications coupling; and
   during a burst communication mode, communicating data at the first device via the first touch surface to the at least one other device during at least one communication frame without executing a touch frame;
   wherein during the touch mode, the first device senses touch on the first touch surface during the plurality of touch frames without executing a communication frame.

2. The method of claim 1, wherein the detected communications coupling at the first touch surface is at least one capacitive coupling conduit.

3. The method of claim 2, wherein the detected at least one capacitive coupling conduit is a touch on the first touch surface.

4. The method of claim 2, wherein the detected at least one capacitive coupling conduit is an object proximate, but not in contact with, the first touch surface.

5. The method of claim 1, the detecting of the communications coupling comprising:
   listening, at the first touch surface, for a signal at a predetermined frequency from the at least one other device, wherein transitioning to the touch communications mode is in response to detecting the signal at the predetermined frequency from the at least one other device.

6. The method of claim 1, further comprising frequency shift key (FSK) encoding the data at the first device before transmitting the data from the first device.

7. The method of claim 1, further comprising at least one of phase shift key (PSK) encoding and quadrature PSK (QPSK) encoding the data at the first device before transmitting the data from the first device.

8. The method of claim 1, further comprising at least one of amplitude modulating (AM) and quadrature amplitude modulating (QAM) the data at the first device before transmitting the data from the first device.

9. The method of claim 1, the detecting of the communications coupling comprising detecting a known signature of the at least one other device.

10. The method of claim 1, wherein the detecting of the communications coupling comprises receiving one or more handshaking signals.

11. The method of claim 1, wherein at least one of the first device and the at least one other device is incorporated within a computing system.

12. The method of claim 1, wherein sensing touch on the first touch surface of the first device comprises processing the sensed touch to detect a position of the sensed touch on the first touch surface and processing the position of the touch event in accordance with a display appearing on the first device at a time of sensing the sensed touch.

13. The method of claim 1,
   wherein transitioning to the burst communication mode is based on an amount of data to be communicated at the first device.

14. A touch device configured to communicate data, comprising:
   a touch controller configured to:
      during a touch mode:
         sense touch on a first touch surface of the touch device during a plurality of touch frames,
         detect a communications coupling with at least one other touch device at the first touch surface of the touch device,
         in response to the detection, transition the touch device to a touch communications mode, and
         during the touch communications mode, sense touch on the first touch surface during at least one touch frame; and
   a communication unit configured to:
      during the touch communications mode, communicate data at the touch device during at least one communication frame, the communicating of data being from the touch device to the at least one other touch device via the first touch surface through the communications coupling; and
      during a burst communication mode, communicate data at the first device via the first touch surface to the at least one other device during at least one communication frame without executing a touch frame;
   wherein during the touch mode, the touch device senses touch on the first touch surface during the plurality of touch frames without executing a communication frame.

15. The touch device of claim 14, wherein the communications coupling is detected when at least one capacitive coupling conduit contacts the first touch surface and at least one other touch surface.

16. The touch device of claim 15, wherein the at least one capacitive coupling conduit is a user contacting the first touch surface and the at least one other touch surface.

17. The touch device of claim 15, wherein the data is communicated via the conduit.

18. The touch device of claim 14, wherein the touch controller is further configured to detect the communications coupling when the first touch surface is proximate, but not in contact with, the at least one other touch surface.

19. The touch device of claim 14, wherein the touch controller is configured to listen for a signal at a predetermined frequency from the at least one other device, wherein transitioning to the touch communications mode is in response to detecting the signal at the predetermined frequency from the at least one other device.

20. The touch device of claim 14, wherein the communication unit is configured to frequency shift keyed (FSK) encode the data at the first device before transmitting the data from the first device.

21. The touch device of claim 14, wherein the communication unit is configured to phase shift keyed (PSK) encode the data at the first device before transmitting the data from the first device.

22. The touch device of claim 14, wherein the communication unit is configured to amplitude modulate (AM) the data at the first device before transmitting the data from the first device.

23. The touch device of claim 14, wherein the communication unit is configured to communicate data using at least one of quadrature PSK and quadrature AM.

24. The touch device of claim 14, wherein at least one of the touch device and the at least one other device is incorporated within a computing system.

25. The touch device of claim 14, wherein sensing touch on the first touch surface of the first device comprises processing the sensed touch to detect a position of the sensed touch on the first touch surface and processing the position of the sensed touch in accordance with a display appearing on the first device at a time of sensing the sensed touch.

26. The touch device of claim 14, wherein transitioning to the burst communication mode is based on an amount of data to be communicated at the first device.

27. A system for data communication between a plurality of touch devices, comprising:
a first touch device having a first touch surface; and
at least one other touch device having at least one other touch surface, wherein the first touch device includes:
a touch controller configured to:
during a touch mode:
sense touch on the first touch surface during a plurality of touch frames,
detect a communications coupling between the first touch surface and the at least one other touch surface,
in response to the detection, transition the first touch device to a touch communications mode, and
during the touch communications mode, sense touch on the first touch surface during at least one touch frame, and
a communication unit configured to:
during the touch communications mode, communicate data between the first touch device and the at least one other touch device during at least one communication frame, the communicating of data being via the first touch surface and the at least one other touch surface; and
during a burst communication mode, communicate data at the first device via the first touch surface to the at least one other device during at least one communication frame without executing a touch frame;
wherein during the touch mode, the first touch device senses touch on the first touch surface during the plurality of touch frames without executing a communication frame.

28. A non-transitory computer-readable storage medium storing program code for enabling data communications, the program code for causing performance of a method comprising:
during a touch mode:
sensing touch on a first touch surface of a first device during a plurality of touch frames;
sensing a touching or hovering object at the first touch surface of the first device during one of the plurality of touch frames;
establishing a communications coupling with a second device at the first touch surface via the touching or hovering object; and
in response to the establishment of the communications coupling, transitioning to a touch communications mode; and
during the touch communications mode:
sensing touch on the first touch surface during at least one touch frame, and
communicating data at the first device during at least one communication frame, the communicating of data being from the first device to the second device via the first touch surface through the communications coupling; and
during a burst communication mode, communicating data at the first device via the first touch surface to the at least one other device during at least one communication frame without executing a touch frame;
wherein during the touch mode, the first device senses touch on the first touch surface during the plurality of touch frames without executing a communication frame.

29. The non-transitory computer-readable storage medium of claim 28, wherein establishing the communications coupling comprises establishing the communications coupling after detecting a known signature of the second device.

* * * * *